(12) United States Patent
McNeely

(10) Patent No.: US 7,054,281 B2
(45) Date of Patent: May 30, 2006

(54) MULTI-CHANNEL TUNER USING A DISCRETE COSINE TRANSFORM

(75) Inventor: David Lowell McNeely, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 300 days.

(21) Appl. No.: 10/428,614

(22) Filed: May 2, 2003

(65) Prior Publication Data

US 2004/0218692 A1  Nov. 4, 2004

(51) Int. Cl.
    *H04B 7/185* (2006.01)
(52) U.S. Cl. ..................................... 370/316
(58) Field of Classification Search ............... 370/203, 370/210, 316, 319, 329, 330, 343; 375/316, 375/346, 350
    See application file for complete search history.

(56) References Cited

U.S. PATENT DOCUMENTS

| | | | | |
|---|---|---|---|---|
| 5,278,837 A | * | 1/1994 | Kelley | .................. 370/343 |
| 5,629,736 A | * | 5/1997 | Haskell et al. | ........... 348/386.1 |
| 5,684,829 A | * | 11/1997 | Kizuki et al. | ................ 375/242 |
| 5,870,402 A | * | 2/1999 | Kelley | ........................ 370/497 |
| 6,449,244 B1 | | 9/2002 | Loseke | |
| 6,473,409 B1 | * | 10/2002 | Malvar | ........................ 370/286 |

OTHER PUBLICATIONS

Gilbert Strang et al., "Wavelets and Filter Banks," Wellesley-Cambridge Press, 1997, pp. 263-336.

* cited by examiner

*Primary Examiner*—Kwang Bin Yao
(74) *Attorney, Agent, or Firm*—Joseph J. Laks; Ronald H. Kurdyla; Joseph J. Opalach

(57) ABSTRACT

A satellite receiver includes a multi-channel tuner for processing a plurality of different transponder signals to simultaneously provide a plurality of different bit streams from at least two of the transponder signals. The multi-channel tuner includes (a) a demultiplexer for demultiplexing a received signal representing the plurality of transponder signals into a plurality of sample signals, each transponder signal conveying a bit stream, (b) a plurality of bifurcated filters operative on the plurality of sample signals for providing a plurality of filtered signals, and (c) a discrete cosine transform element operative on the plurality of filtered signals for simultaneously providing at least two of the bitstreams.

18 Claims, 18 Drawing Sheets

FIG. 9

$$CC = \begin{bmatrix} \text{(matrix of 0s and 1s)} \end{bmatrix}$$

FIG. 10

$$CD = \begin{bmatrix} C(\frac{\pi}{64}) & -S(\frac{\pi}{64}) \\ S(\frac{\pi}{64}) & C(\frac{\pi}{64}) \\ & & C(\frac{5\pi}{64}) & -S(\frac{5\pi}{64}) \\ & & S(\frac{5\pi}{64}) & C(\frac{5\pi}{64}) \\ & & & & C(\frac{9\pi}{64}) & -S(\frac{9\pi}{64}) \\ & & & & S(\frac{9\pi}{64}) & C(\frac{9\pi}{64}) \\ & & & & & & 0 \\ & & & & & & & C(\frac{13\pi}{64}) & -S(\frac{13\pi}{64}) \\ & & & & & & & S(\frac{13\pi}{64}) & C(\frac{13\pi}{64}) \\ & & & & & & & & & C(\frac{17\pi}{64}) & -S(\frac{17\pi}{64}) \\ & & & & & & & & & S(\frac{17\pi}{64}) & C(\frac{17\pi}{64}) \\ & & & & & & & & & & & C(\frac{21\pi}{64}) & -S(\frac{21\pi}{64}) \\ & & & & & & & & & & & S(\frac{21\pi}{64}) & C(\frac{21\pi}{64}) \\ & & & & & & & & & & & & & 0 \\ & & & & & & & & & & & & & & C(\frac{25\pi}{64}) & -S(\frac{25\pi}{64}) \\ & & & & & & & & & & & & & & S(\frac{25\pi}{64}) & C(\frac{25\pi}{64}) \\ & & & & & & & & & & & & & & & & C(\frac{29\pi}{64}) & -S(\frac{29\pi}{64}) \\ & & & & & & & & & & & & & & & & S(\frac{29\pi}{64}) & C(\frac{29\pi}{64}) \end{bmatrix}$$

FIG. 11

$$CDFT3 = \begin{bmatrix} 1 & 1 & 1 & 1 & 1 & 1 & 0 & -1 & 0 & 1 & 0 & 1 & 1 & 1 & 0 & -1 & 0 & 1 \end{bmatrix}$$

$$CDFT4 = \begin{bmatrix}
1 & 0 & 1 & 0 & 0 & 0 & 0 & 0 & 0 & 0 & 0 & 0 & 0 & 0 & 0 & 0 & 0 & 0 \\
0 & 1 & 0 & 1 & 0 & 0 & 0 & 0 & 0 & 0 & 0 & 0 & 0 & 0 & 0 & 0 & 0 & 0 \\
1 & 0 & -1 & 0 & 0 & 0 & 0 & 0 & 0 & 0 & 0 & 0 & 0 & 0 & 0 & 0 & 0 & 0 \\
0 & 1 & 0 & -1 & 0 & 0 & 0 & 0 & 0 & 0 & 0 & 0 & 0 & 0 & 0 & 0 & 0 & 0 \\
0 & 0 & 0 & 0 & 1 & 0 & 1 & 0 & 0 & 0 & 0 & 0 & 0 & 0 & 0 & 0 & 0 & 0 \\
0 & 0 & 0 & 0 & 0 & 1 & 0 & 1 & 0 & 0 & 0 & 0 & 0 & 0 & 0 & 0 & 0 & 0 \\
0 & 0 & 0 & 0 & 1 & 0 & -1 & 0 & 0 & 0 & 0 & 0 & 0 & 0 & 0 & 0 & 0 & 0 \\
0 & 0 & 0 & 0 & 0 & 1 & 0 & -1 & 0 & 0 & 0 & 0 & 0 & 0 & 0 & 0 & 0 & 0 \\
0 & 0 & 0 & 0 & 0 & 0 & 0 & 0 & 1 & 0 & 1 & 0 & 0 & 0 & 0 & 0 & 0 & 0 \\
0 & 0 & 0 & 0 & 0 & 0 & 0 & 0 & 0 & 1 & 0 & 1 & 0 & 0 & 0 & 0 & 0 & 0 \\
0 & 0 & 0 & 0 & 0 & 0 & 0 & 0 & 1 & 0 & -1 & 0 & 0 & 0 & 0 & 0 & 0 & 0 \\
0 & 0 & 0 & 0 & 0 & 0 & 0 & 0 & 0 & 1 & 0 & -1 & 0 & 0 & 0 & 0 & 0 & 0 \\
0 & 0 & 0 & 0 & 0 & 0 & 0 & 0 & 0 & 0 & 0 & 0 & 1 & 0 & 1 & 0 & 0 & 0 \\
0 & 0 & 0 & 0 & 0 & 0 & 0 & 0 & 0 & 0 & 0 & 0 & 0 & 1 & 0 & 1 & 0 & 0 \\
0 & 0 & 0 & 0 & 0 & 0 & 0 & 0 & 0 & 0 & 0 & 0 & 1 & 0 & -1 & 0 & 0 & 0 \\
0 & 0 & 0 & 0 & 0 & 0 & 0 & 0 & 0 & 0 & 0 & 0 & 0 & 1 & 0 & -1 & 0 & 0 \\
0 & 0 & 0 & 0 & 0 & 0 & 0 & 0 & 0 & 0 & 0 & 0 & 0 & 0 & 0 & 0 & 1 & 0 \\
0 & 0 & 0 & 0 & 0 & 0 & 0 & 0 & 0 & 0 & 0 & 0 & 0 & 0 & 0 & 0 & 0 & -1
\end{bmatrix}$$

$$CDFT1 = \begin{bmatrix} 1 & 1 & 1 & 1 & 1 & 1 & 1 & 1 \\ 1 & 1 & 0 & C(\frac{\pi}{4}) & S(\frac{\pi}{4}) & 0 & C(\frac{\pi}{4}) & S(\frac{\pi}{4}) \\ & & & -S(\frac{\pi}{4}) & C(\frac{\pi}{4}) & & -S(\frac{\pi}{4}) & C(\frac{\pi}{4}) \\ & & 0 & 1 & & & & \\ & & -1 & 0 & & & & \end{bmatrix}$$

FIG. 14

$$CDFT0 = \begin{bmatrix} 1 & 0 & 0 & 0 & 0 & 0 & 0 & 0 & 1 & 0 & 0 & 0 & 0 & 0 & 0 & 0 \\ 0 & 1 & 0 & 0 & 0 & 0 & 0 & 0 & 0 & 1 & 0 & 0 & 0 & 0 & 0 & 0 \\ 0 & 0 & 1 & 0 & 0 & 0 & 0 & 0 & 0 & 0 & 1 & 0 & 0 & 0 & 0 & 0 \\ 0 & 0 & 0 & 1 & 0 & 0 & 0 & 0 & 0 & 0 & 0 & 1 & 0 & 0 & 0 & 0 \\ 0 & 0 & 0 & 0 & 1 & 0 & 0 & 0 & 0 & 0 & 0 & 0 & 1 & 0 & 0 & 0 \\ 0 & 0 & 0 & 0 & 0 & 1 & 0 & 0 & 0 & 0 & 0 & 0 & 0 & 1 & 0 & 0 \\ 0 & 0 & 0 & 0 & 0 & 0 & 1 & 0 & 0 & 0 & 0 & 0 & 0 & 0 & 1 & 0 \\ 0 & 0 & 0 & 0 & 0 & 0 & 0 & 1 & 0 & 0 & 0 & 0 & 0 & 0 & 0 & 1 \\ 1 & 0 & 0 & 0 & 0 & 0 & 0 & 0 & -1 & 0 & 0 & 0 & 0 & 0 & 0 & 0 \\ 0 & 1 & 0 & 0 & 0 & 0 & 0 & 0 & 0 & -1 & 0 & 0 & 0 & 0 & 0 & 0 \\ 0 & 0 & 1 & 0 & 0 & 0 & 0 & 0 & 0 & 0 & -1 & 0 & 0 & 0 & 0 & 0 \\ 0 & 0 & 0 & 1 & 0 & 0 & 0 & 0 & 0 & 0 & 0 & -1 & 0 & 0 & 0 & 0 \\ 0 & 0 & 0 & 0 & 1 & 0 & 0 & 0 & 0 & 0 & 0 & 0 & -1 & 0 & 0 & 0 \\ 0 & 0 & 0 & 0 & 0 & 1 & 0 & 0 & 0 & 0 & 0 & 0 & 0 & -1 & 0 & 0 \\ 0 & 0 & 0 & 0 & 0 & 0 & 1 & 0 & 0 & 0 & 0 & 0 & 0 & 0 & -1 & 0 \\ 0 & 0 & 0 & 0 & 0 & 0 & 0 & 1 & 0 & 0 & 0 & 0 & 0 & 0 & 0 & -1 \end{bmatrix}$$

FIG. 15

$$CE = \begin{bmatrix} 1 & & & & & & & \\ & \begin{matrix} C(\frac{\pi}{16}) & S(\frac{\pi}{16}) \\ -S(\frac{\pi}{16}) & C(\frac{\pi}{16}) \end{matrix} & & & & & & \\ & & \begin{matrix} C(\frac{\pi}{8}) & S(\frac{\pi}{8}) \\ -S(\frac{\pi}{8}) & C(\frac{\pi}{8}) \end{matrix} & & & & & \\ & & & \begin{matrix} C(\frac{3\pi}{16}) & S(\frac{3\pi}{16}) \\ -S(\frac{3\pi}{16}) & C(\frac{3\pi}{16}) \end{matrix} & & & & \\ & & & & \begin{matrix} C(\frac{\pi}{4}) & S(\frac{\pi}{4}) \\ -S(\frac{\pi}{4}) & C(\frac{\pi}{4}) \end{matrix} & & & \\ & & & & & \begin{matrix} C(\frac{5\pi}{16}) & S(\frac{5\pi}{16}) \\ -S(\frac{5\pi}{16}) & C(\frac{5\pi}{16}) \end{matrix} & & \\ & & & & & & \begin{matrix} C(\frac{3\pi}{8}) & S(\frac{3\pi}{8}) \\ -S(\frac{3\pi}{8}) & C(\frac{3\pi}{8}) \end{matrix} & \\ & & & & & & & \begin{matrix} C(\frac{7\pi}{16}) & S(\frac{7\pi}{16}) \\ -S(\frac{7\pi}{16}) & C(\frac{7\pi}{16}) \end{matrix} \end{bmatrix}$$

FIG. 16

$$CF = \begin{bmatrix}
1 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & -1 & 0 & 0 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & -1 & 0 & 0 & 0 & 0 & 0 & 0 & 0 & 0 & 0 & 0 & 0 & 0 & 0 \\
0 & 0 & 0 & -1 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 0 & 0 & 0 & 0 \\
0 & 0 & 0 & 0 & -1 & 0 & 0 & 0 & 0 & 0 & 0 & 0 & 0 & 0 & 0 & 0 \\
0 & 0 & 0 & 0 & 0 & -1 & 0 & 0 & 0 & 0 & 0 & 0 & 0 & 0 & 0 & 0 \\
0 & 0 & 0 & 0 & 0 & 0 & -1 & 0 & 0 & 0 & 0 & 0 & 0 & 0 & 0 & 0 \\
0 & 0 & 0 & 0 & 0 & 0 & 0 & 1 & 0 & 0 & 0 & 0 & 0 & 0 & 0 & 0 \\
0 & 0 & 0 & 0 & 0 & 0 & 0 & 0 & -1 & 0 & 0 & 0 & 0 & 0 & 0 & 0 \\
0 & 0 & 0 & 0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & -1 & 0 & 0 & 0 & 0 & 0 \\
0 & 0 & 0 & 0 & 0 & 0 & 0 & 0 & 0 & 0 & 0 & 1 & 0 & 0 & 0 & 0 \\
0 & 0 & 0 & 0 & 0 & 0 & 0 & 0 & 0 & 0 & 0 & 0 & -1 & 0 & 0 & 0 \\
0 & 0 & 0 & 0 & 0 & 0 & 0 & 0 & 0 & 0 & 0 & 0 & 0 & 1 & 0 & 0 \\
0 & 0 & 0 & 0 & 0 & 0 & 0 & 0 & 0 & 0 & 0 & 0 & 0 & 0 & 1 & 0 \\
0 & 0 & 0 & 0 & 0 & 0 & 0 & 0 & 0 & 0 & 0 & 0 & 0 & 0 & 0 & -1
\end{bmatrix}$$

MULTI-CHANNEL TUNER USING A DISCRETE COSINE TRANSFORM

CROSS-REFERENCE TO RELATED APPLICATIONS

This application is related to the copending, commonly assigned U.S. patent application Ser. No. 10/428,973, entitled "A Transform-Based Alias Cancellation Multi-Channel Tuner" filed on even date herewith.

BACKGROUND OF THE INVENTION

The present invention generally relates to signal receiving devices, and more particularly, to a multi-channel satellite signal receiver.

A conventional satellite receiving device, such as a direct broadcast satellite (DBS) receiver, can tune to any one of a number of satellite transponders, each transponder transmitting a downlink signal in a particular frequency band. The transponder downlink signal typically represents a bit stream in a packet format, the packets conveying data, such as audio, video, programming information, etc., associated with one or more broadcast channels or services. In this regard, each transponder is typically associated with a different set of broadcast channels. As such, a desired sports program may be found on one of the broadcast channels associated with one transponder while a movie may be found on one of the broadcast channels associated with a different transponder.

Unfortunately, as noted above, such a conventional satellite receiving device only tunes to one downlink signal from one transponder at a time. This leads to a number of problems. For example, "channel surfing," i.e., switching from one broadcast channel to another, may entail switching transponders, which causes additional processing delays—delays that slow down the channel surfing process. Further, in households that desire to simultaneously watch, or listen, to programs associated with different transponders—those households must spend more money to purchase, or lease, multiple conventional satellite receiving devices.

SUMMARY OF THE INVENTION

Therefore, and in accordance with the principles of the invention, a receiving device includes a multi-channel tuner for simultaneously processing a plurality of received signals, each received signal corresponding to a bit stream. The receiver includes a receiver section for providing a signal having a plurality of different frequency channels, each frequency channel conveying a different bit stream and a multi-channel signal tuner operative on the signal for recovering the different bit streams from at least two of the plurality of different frequency channels and for simultaneously providing the recovered different bits streams, wherein the multi-channel signal tuner utilizes a discrete cosine transformation (DCT).

In one embodiment of the invention, the receiving device is a satellite receiver. The satellite receiver comprises a multi-channel tuner that includes (a) a demultiplexer for demultiplexing a received signal representing a plurality of transponder signals into a plurality of sample signals, each transponder signal conveying a bit stream, (b) a plurality of bifurcated filters operative on the plurality of sample signals for providing a plurality of filtered signals, and (c) a discrete cosine transform element operative on the plurality of filtered signals for simultaneously providing signals representing at least two of the bitstreams.

In another embodiment of the invention, an integrated circuit includes a transform element for receiving a plurality of signals. The transform element is operative on the received plurality of signals using a discrete cosine transform to simultaneously provide signals representing at least two bit streams, each bit stream associated with a different transmission frequency band. Illustratively, each frequency band is associated with a different transponder of a satellite cable distribution network.

In another embodiment of the invention, the receiving device is a satellite receiver. The satellite receiver performs a multi-channel tuning method that includes (a) demultiplexing a received signal representing a plurality of transponder signals into a plurality of signals, each transponder signal conveying a bit stream, (b) filtering the plurality of signals to provide a plurality of filtered signals, and (c) transforming the plurality of filtered signals in accordance with a discrete cosine transform for simultaneously providing signals representing at least two of the bitstreams.

BRIEF DESCRIPTION OF THE DRAWINGS

Figure 9:
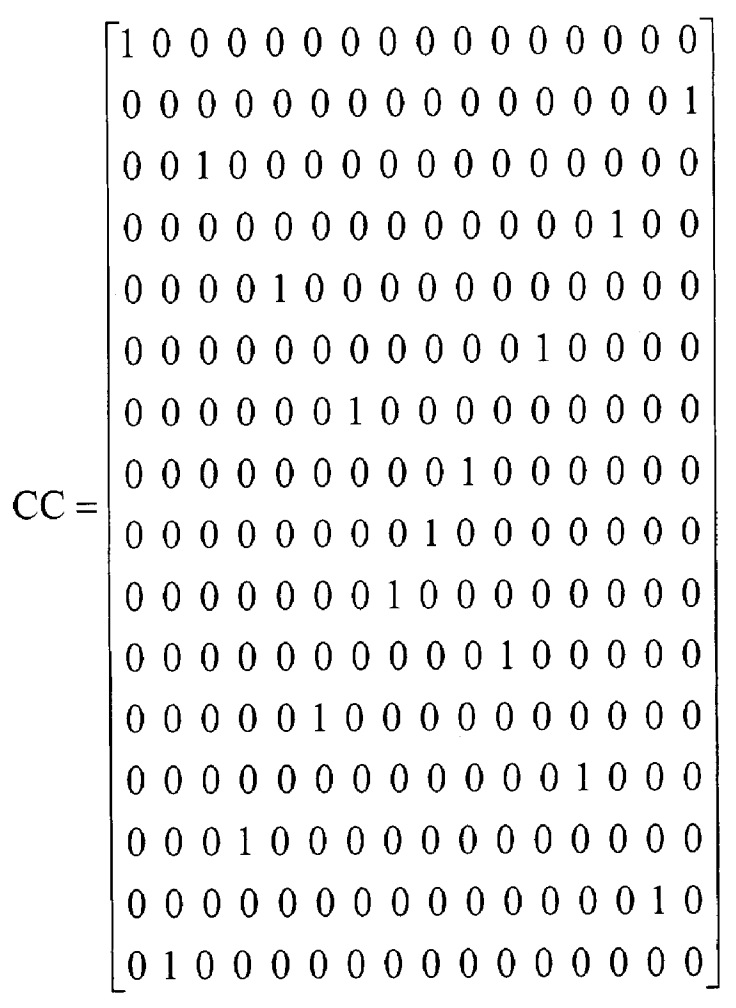
Figure 12:
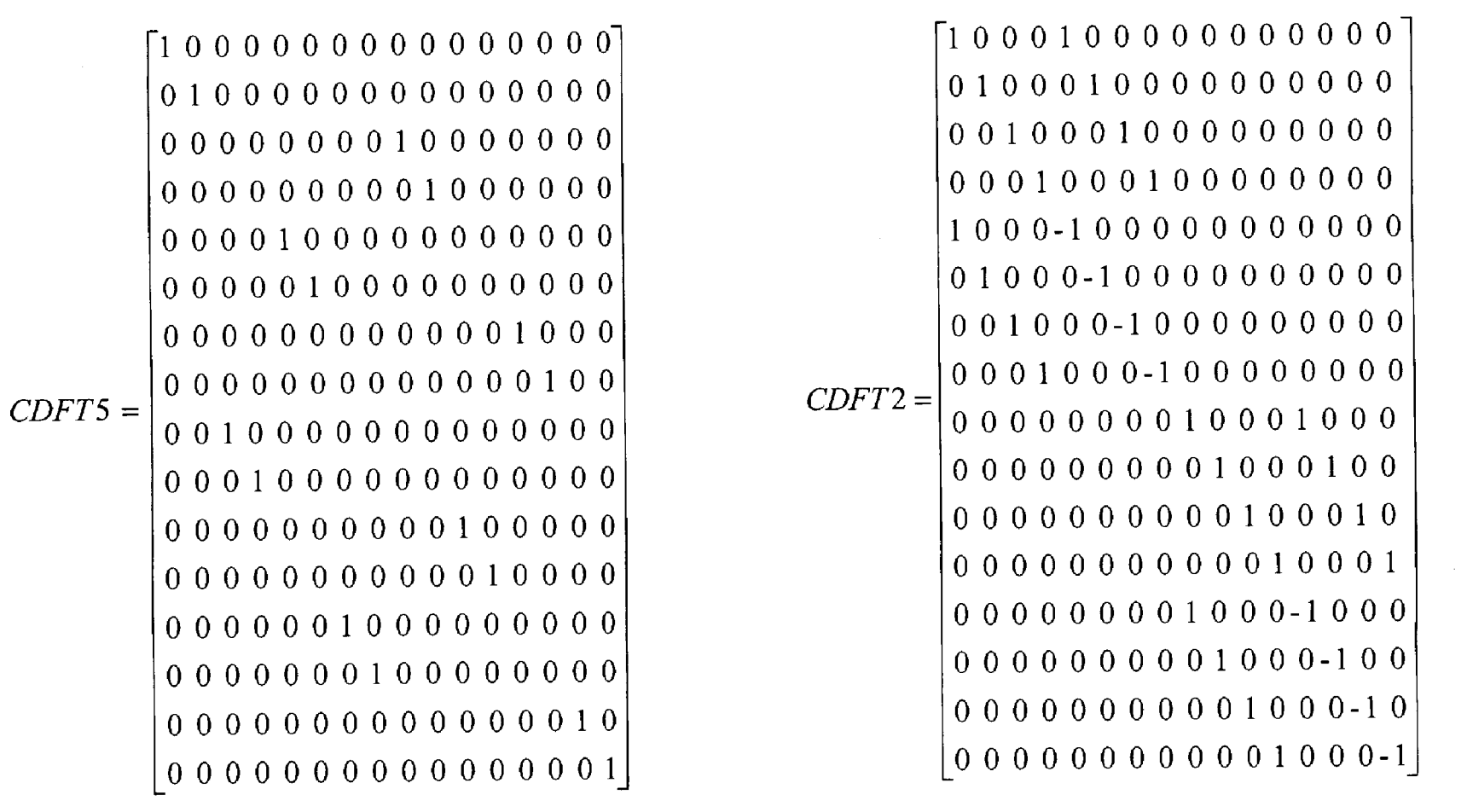

FIGS. 9–16 show illustrative matrix values for use in transform element 330 of FIG. 6;

DETAILED DESCRIPTION

Other than the inventive concept, the elements shown in the figures are well known and will not be described in detail. Also, familiarity with satellite-based program distribution is assumed and is not described in detail herein. For example, other than the inventive concept, satellite transponders, downlink signals, a radio-frequency (rf) front-end, or receiver section, such as a low noise block, and formatting and encoding methods (such as Moving Picture Expert Group (MPEG)-2 Systems Standard (ISO/IEC 13818-1)) for generating transport bit streams are well-known and not described herein. In addition, the inventive concept may be implemented using conventional programming techniques, which, as such, will not be described herein. Finally, like-numbers on the figures represent similar elements.

Figure 1:
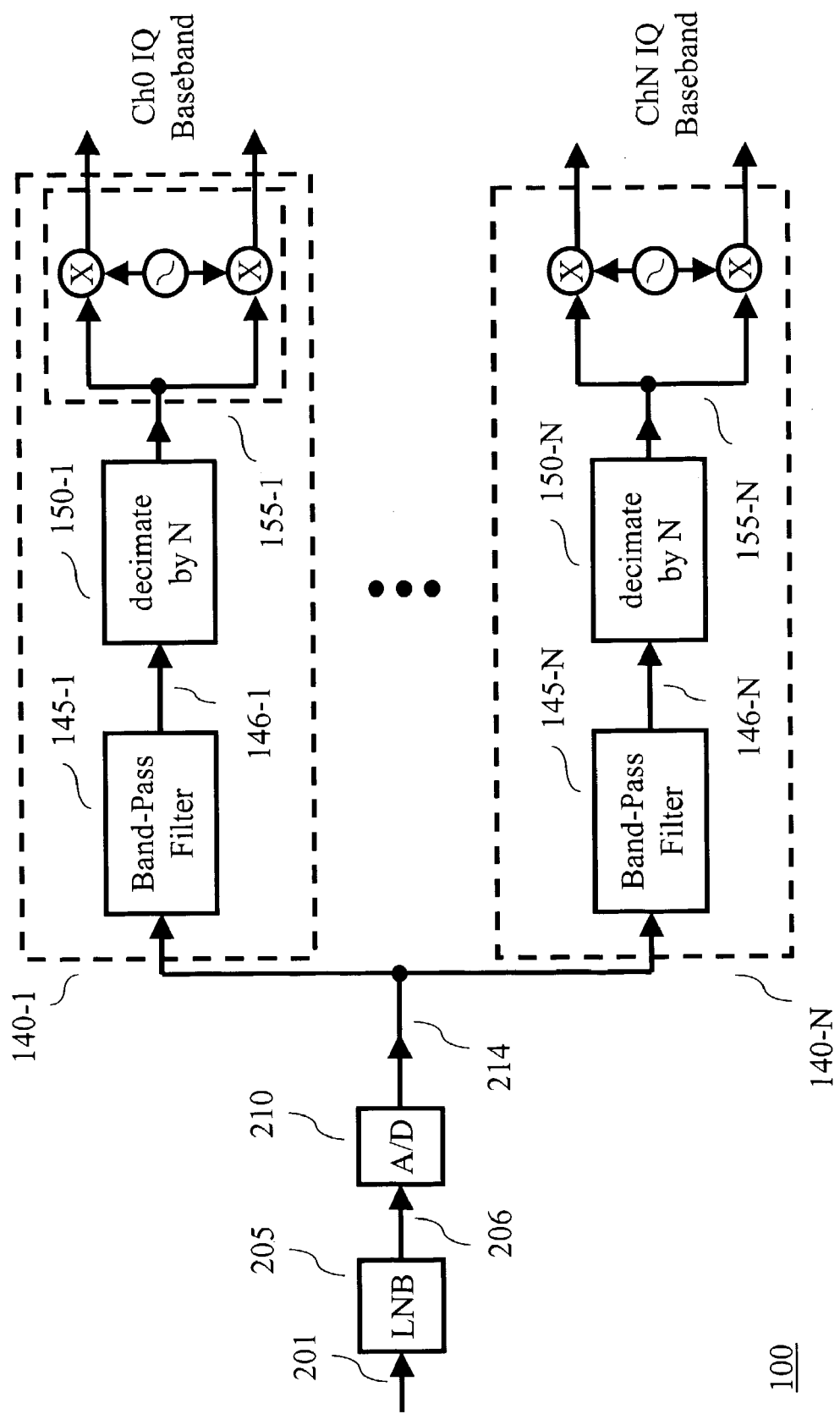
FIG. 1 illustrates an embodiment of a multi-channel tuner.

An embodiment of a multi-channel receiver 100 is illustrated in FIG. 1. Receiver 100 includes a low noise block (LNB) 205, an analog-to-digital (A/D) converter 210, and a bank of tuning elements 140-1 through 140-N. One or more satellites (not shown) transmit a plurality of downlink radio frequency (RF) signals 201 in different frequency bands (or frequency channels) associated with different transponders at the same polarization. Each transponder-specific RF signal represents a different transport bit stream encoded, e.g., in accordance with the above-mentioned MPEG2. The RF signals 201 may, e.g., be in the frequency range of 17 GHz (giga-hertz). Illustratively, RF signals 201 includes N adjacent frequency channels, whose center frequencies are $F_0$ to $F_{N-1}$, respectively. The channel spacing, $F_S$, is illustratively uniform and equal to the separation between adjacent center frequencies, e.g., $F_S=F_2-F_1$. As such, the total bandwidth of all frequency bands, $F_{total}$, equals $NF_S$. Each frequency channel contains a modulation on its center frequency (carrier) of bandwidth $F_{bw}$ and has an excess bandwidth of x % and a guard band $F_{gb}$, where $F_{gb}=(F_s-(F_{bw}[(100+x)/100]))$. For purposes of illustration, it is assumed that N=16, and $F_S$=29.164 MHz, which is also illustrative of a sixteen transponder digital satellite system (DSS).

The RF signals 201 are received by one or more antennas (not shown) of receiver 100 for application to low noise block (LNB) 205. The latter down shifts and filters the received RF signals 201 and provides a signal 206, which is a near base-band signal having a total bandwidth across all channels of $F_{total}$. For example, the lowest frequency channel (e.g., channel 0) has a carrier $F_0=F_S/2$. This is further illustrated in FIG. 2, which shows the spectrum of the near base-band signal 206 for the 16 DSS channels. Returning to FIG. 1, signal 206 is converted from the analog domain to the digital domain via A/D converter 210, which samples signal 206 at a sampling rate, $F_{samp}$, equal to or greater than the Nyquist rate for signal 206. Illustratively, $F_{samp}=2F_{total}$, i.e., the sampling rate is twice the total bandwidth across all frequency channels, i.e., $F_{samp}=2NF_S$. In this example, $F_{samp}$=933.12 MHz. A/D 210 provides a signal 214, which is a discrete time sequence of samples representing the plurality of transponder channels at the sample rate, $F_{samp}$.

Figure 3:
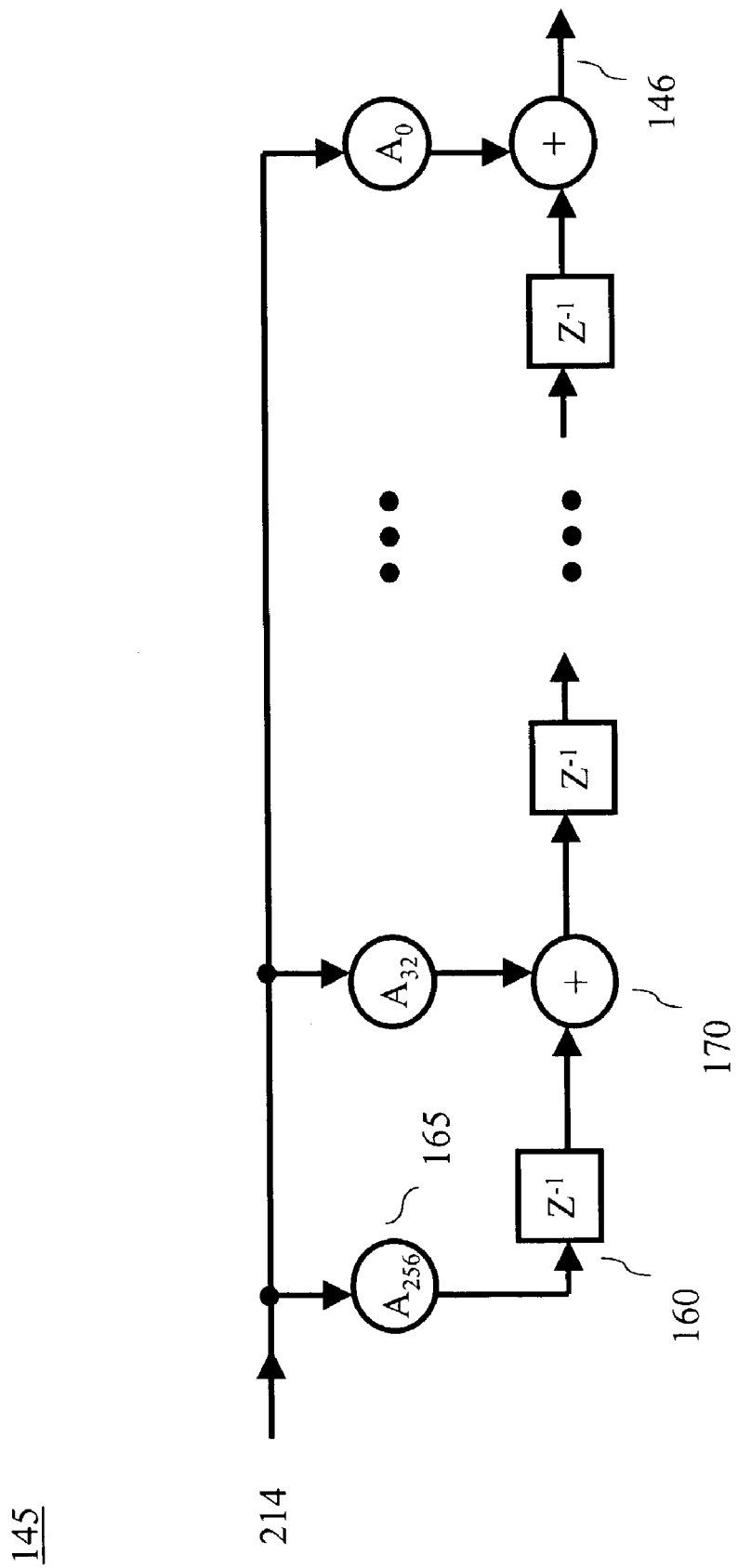
FIG. 3 shows an illustrative filter for use in the multi-channel tuner of FIG. 1.

Signal 214 is applied to the bank of tuning elements 140-1 to 140-N. Each tuning element filters signal 214 at a particular one of the N transponder channels to simultaneously provide a respective inphase/quadrature (IQ) baseband signal representing the associated transport bit stream. For example, tuning element 140-1 includes a bandpass filter 145-1, a decimate by N element 150-1 and a demodulator 155-1. Bandpass filter 145-1 has a passband centered by $F_0$, and a stop band that attenuates the remaining transponder channels. As such, bandpass filter 145-1 filters signal 214 to provide a filtered signal 146-1 that represents only channel 0 (Ch0). An illustrative block diagram of a representative filter 145, which provides an output signal 146, is shown in FIG. 3. Filter 145, e.g., illustratively includes 256 tap coefficients as represented by tap coefficient 165, delay elements $Z^{-1}$ as represented by delay element 160, each of which provide a time delay equal to $\frac{1}{2}(NF_S)$, and adders as represented by adder 170. The sample data impulse response of bandpass filter 145 is the sample impulse data response of a low-pass filter (not shown) modulated by a sample data representation of a cosine wave at the carrier frequency of the transponder channel to be received. The phase of this cosine wave is so arranged that zero degrees aligns with the center of the linear phase low pass sample data impulse response. Since signal 146 is a sequence of samples that only represents those samples associated with a particular transponder channel, this signal is now over-sampled at $F_{samp}$. This means that relative to a single received transponder channel the sample rate is much greater than required. As such, and returning to FIG. 1, signal 146-1 is now decimated by N (where N, again, is the number of transponder channels) via element 150-1 to provide a sequence of samples at 1/Nth the sample rate, i.e., $2F_S$, to demodulator 155-1. The latter includes a half-channel spacing sine/cosine generator for demodulation at the associated transponder frequency, e.g., $F_0$. Demodulator 155-1 provides an inphase/quadrature baseband signal representing the associated transport bit stream.

It can be observed from FIG. 1, that N tuning elements are required to simultaneously provide N transport bit streams. In addition, the filtering process of each bandpass filter 145, must run at a very high clock rate. For example, the symbol rate of signal 214 is close to 1 GHz (giga-hertz). However, and in accordance with the principles of the invention, it is possible to transform the architecture of receiver 100 into an architecture such that the high speed pipelined calculations followed by a decimation operation as illustrated in receiver 100 are replaced with a number of lower speed parallel calculations, which are then summed together.

Figure 2:
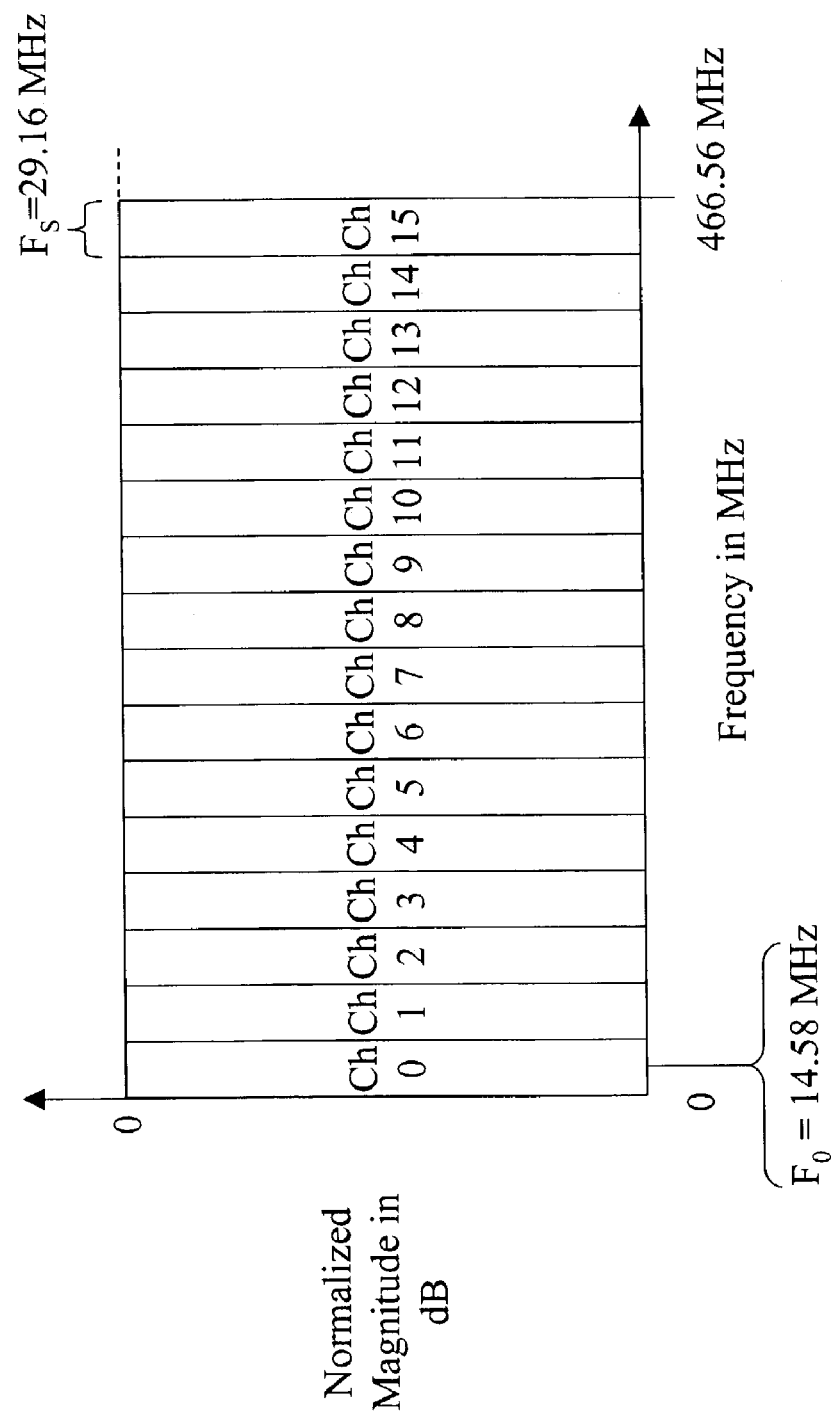
FIG. 2 shows an illustrative frequency spectrum for a signal representing 16 transponder channels.

In particular, assume that N=16 DSS transponder channels as illustrated in FIG. 2. Illustratively, A/D 210 samples signal 206 (described earlier) at the Nyquist rate equal to $2NF_S$. Each transponder channel carrier frequency, $F_{ch}$, is located in the middle of the corresponding frequency channel. As such, for N channels, numbered 0 to N−1:

$$F_{CH} = ch \cdot F_S + \frac{F_S}{2}, \qquad (1)$$

where $0 \leq ch \leq N-1$. The transponder carrier channel frequencies can be normalized to the sampling rate $2NF_S$. In this case, equation (1) becomes:

$$F_{CHN} = \frac{(2 \cdot ch + 1)}{4 \cdot N}, \qquad (2)$$

where $F_{CHN}$ represents the normalized transponder carrier frequency for a particular channel, ch, where, again, $0 \leq ch \leq N-1$. The set of normalized transponder carrier frequencies is referred to as a carrier set. For N=16 transponder channels, there are 16 normalized transponder carrier frequencies in the carrier set. In accordance with an aspect of the invention, I have observed that this carrier set corresponds to a variant of the type 4 Discrete Cosine Transform. Application of the type 4 DCT in this application for complex modulations has an advantage in that the IQ (in-phase/quadrature) modulation is maintained as a real near base band signal for down stream conventional near base band demodulation.

Figure 4:
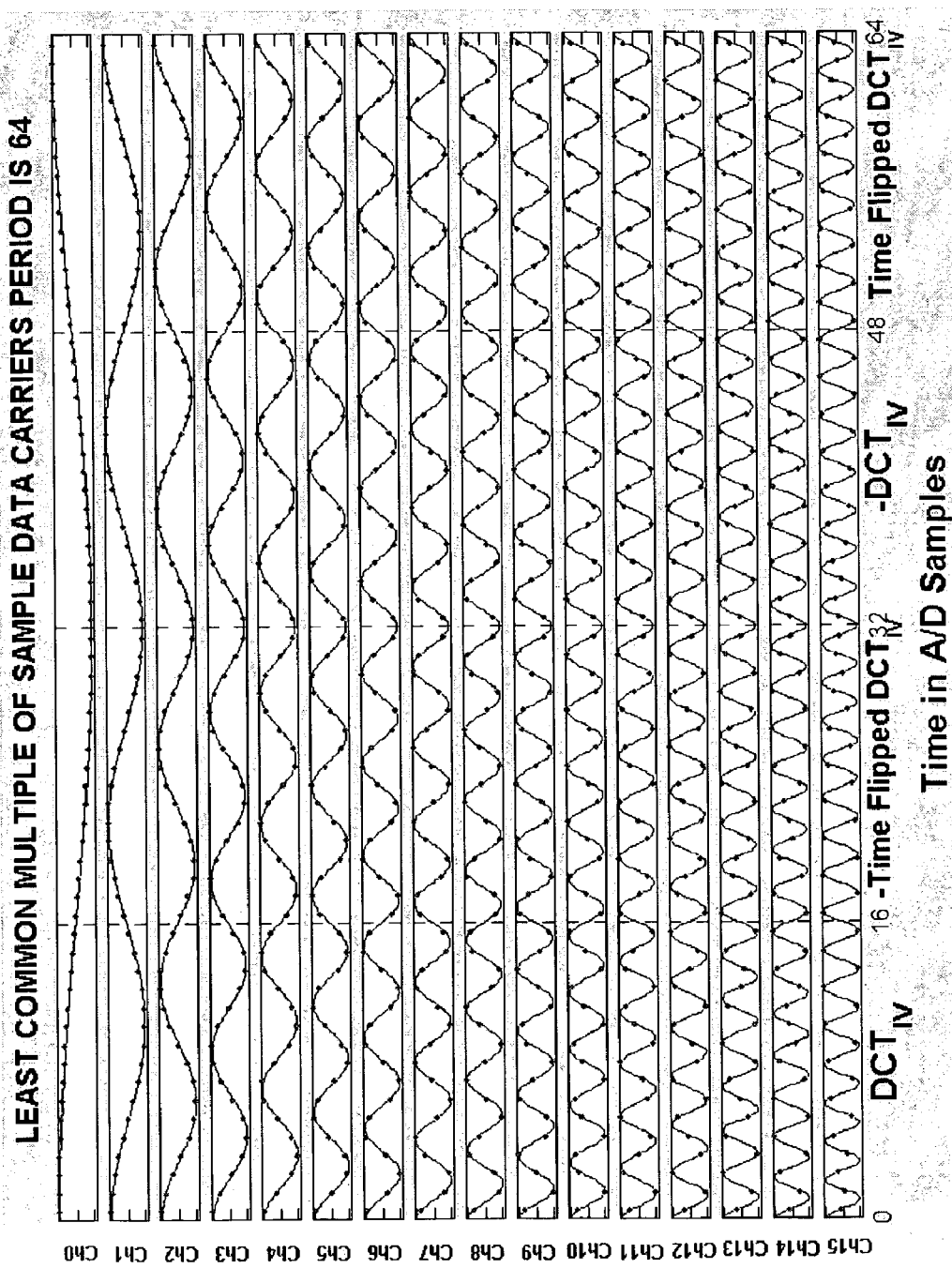
FIG. 4 illustrates the relationship between a carrier set and a type 4 discrete carrier transform in accordance with the principles of the invention.

The equation for a N point type 4 (or IV) DCT is shown below:

$$DCT_N^{IV}(i,j) = \sqrt{\frac{2}{N}} \cdot \cos\left(2\pi \cdot \frac{2j+1}{4N} \cdot \frac{2i+1}{2N}\right), \qquad (3)$$

where i is the time index and $0 \leq i \leq N-1$; and j is the frequency index (frequency channel number) and $0 \leq j \leq N-1$, and N is the number of frequency channels. The relationship between the type 4 DCT and the carrier set is illustrated in FIG. 4 for N=16. In FIG. 4, it is assumed that the A/D converter (e.g., A/D 210) samples at 32 times the channel spacing so that 16 channels are equally spaced between 0 and the Nyquist folding frequency. Continuous Cosines at $F_{ch}$ of each frequency channel (Ch0 to Ch15) are illustrated in FIG. 4. A sample data representation of each cosine carrier at the A/D sample rate is represented by the black dots on the continuous cosines shown in FIG. 4. Along the axis labeled "Time in A/D Samples", the relationship between the carrier set and the type 4 DCT is noted. In the first 16 samples (1–16), each carrier is exactly equal to a 16 point type 4 DCT, as signified by the axis label "$DCT_{IV}$." In the next set of 16 samples (17–32), each carrier is minus the time flipped 16 point type 4 DCT, as signified by the axis label "–Time Flipped $DCT_{IV}$." The third set of samples (33–48) is exactly equal to minus the type 4 DCT, as signified by the axis label "–$DCT_{IV}$." The final set of 16 samples (49–64) is exactly equal to the time flipped type 4 DCT, as signified by the axis label "Time Flipped $DCT_{IV}$." The aforementioned pattern of sign changes and time order flips continuously repeats for any desired length of carrier set. This generalizes to any number of channels N and any order DCT. Another way to look at FIG. 4 is to view the axis labels as identifying the operations required to be performed on a cosine carrier for the cosine carrier to match a type 4 DCT. For example, for time samples 49–64, the cosine carrier must be "time flipped" to match a 16 point type 4 DCT. Therefore, and in accordance with another aspect of the invention, the earlier described filter 145 can be used as the basis for exploiting the symmetries of a type 4 Discrete Cosine Transform.

Now, assume a single low pass finite impulse response (FIR) filter for processing the multi-channel transponder signal. Let a sample data impulse response (in the z-domain) of the FIR filter be:

$$H_{LPF}(z) = \sum_{l=0}^{k \cdot N-1} A_l \cdot z^{-i}, \quad (4)$$

where $A_l$ are the filter tap coefficients, $z^{-i}$ are delay elements, k is the number of filter taps, $0 \leq l \leq N-1$, and N is the number of frequency channels. In accordance with an aspect of the invention, the architectural trick for using a DCT is to divide each filter such that different subsets of the taps are separately accumulated to provide partial results that match the symmetry of a DCT. In this example, the division of the filter is a bifurcation such that the odd and even tap coefficients are separately accumulated thus providing partial results that match the symmetry of the DCT type 4 as illustrated in FIG. 4. (It should be noted that the inventive concept is not limited to a bifurcation.) In addition, the tap coefficients, $A_l$, will be distributed among different ones of the bifurcated filters.

Figure 5:
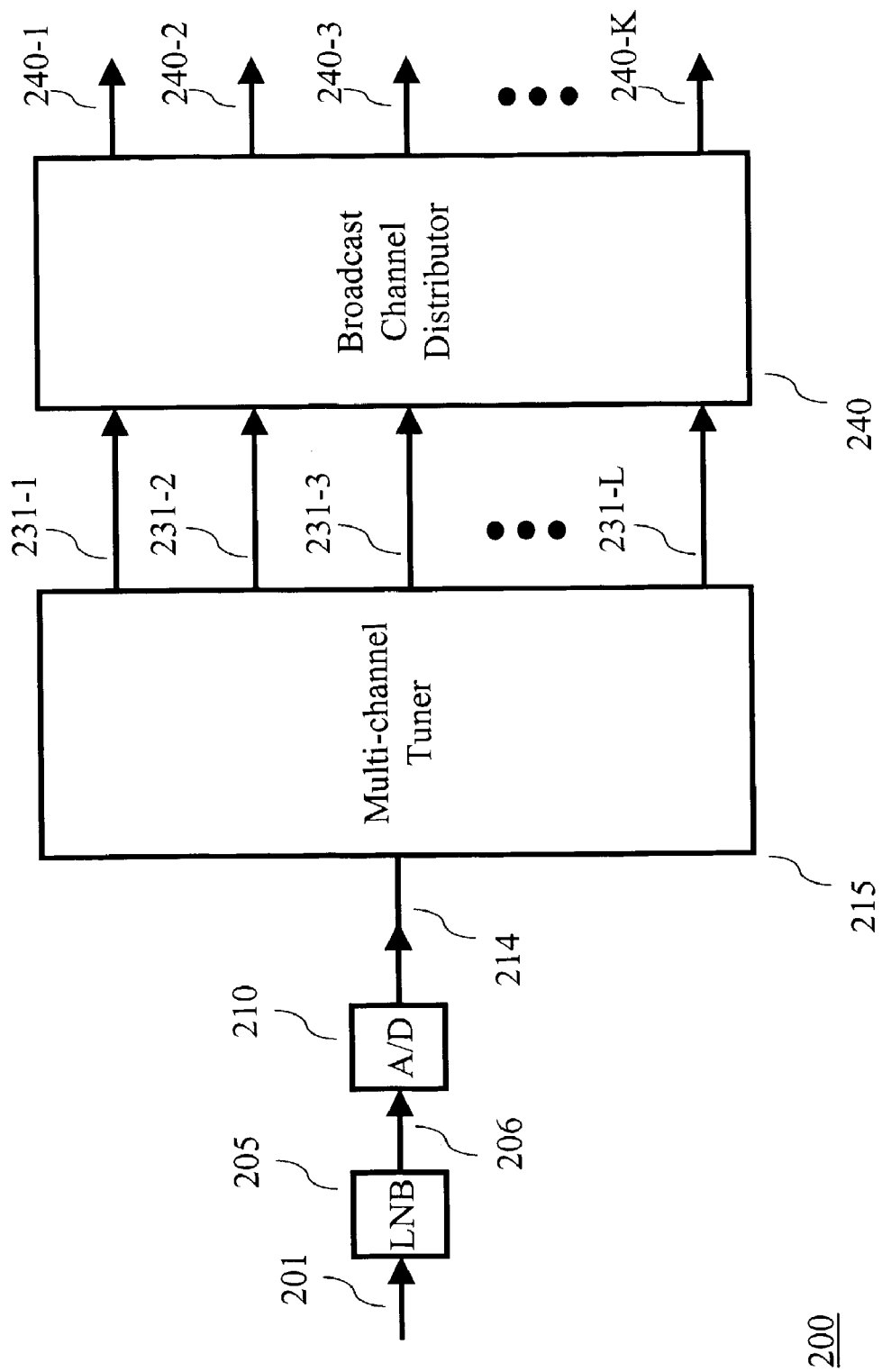
FIG. 5 is an illustrative block-level diagram of a receiver embodying the principles of the invention.

Turning now to FIG. 5, an illustrative receiver 200 in accordance with the principles of the invention is shown. Receiver 200 includes a low noise block (LNB) 205, an analog-to-digital (A/D) converter 210, a multi-channel tuner 215 and a broadcast channel distributor 240. As described above, one or more satellites (not shown) transmit a plurality of downlink radio frequency (RF) signals 201 in different frequency bands (or frequency channels) associated with different transponders at the same polarization. RF signals 201 are processed by LNB 205 to provide signal 206, which is a near base-band signal having a total bandwidth across all channels of $F_{total}$. (Again, this is illustrated in FIG. 2 for 16 DSS channels.) Signal 206 is converted from the analog domain to the digital domain via A/D converter 210, which samples signal 206 at a sampling rate, $F_{samp}=2NF_S$, to provide signal 214, which is a discrete time sequence of samples representing the plurality of transponder channels. Signal 214 is applied to multi-channel tuner 215 (described below), which, in accordance with the principles of the invention, processes signal 214 to provide a number of simultaneous bit streams from two or more transponder channels as represented by bit streams 231-1 through 231-L, where 1<L≦N. It should be noted that these simultaneous bit streams are applied to broadcast channel distributor 240, which processes each of the bit streams to provide data associated with virtual channels 240-1 through 240-K, where K>1. For example, broadcast channel distributor 240 decodes each of the bit streams encoded, e.g., in accordance with the earlier-mentioned MPEG-2 Systems Standard ISO/IEC 13818-1. As such, each of these virtual channels represents content and/or services, for example, audio, video (e.g., a selected movie), electronic programming guide etc. It should be realized the although shown as separate signals 240-1 through 240-K, one, or more, of these signals may be multiplexed together for transmission on a broadcast medium, e.g., a cable, or via wireless (such as Wi-Fi (Wireless Fidelity)). For simplicity, other input signals to broadcast channel distributor 240 specifying selection of content and/or services has not been shown. Likewise, other circuitry for delivering the content/services, which may, or may not, be a part of receiver 200 also not been shown.

Figure 6:
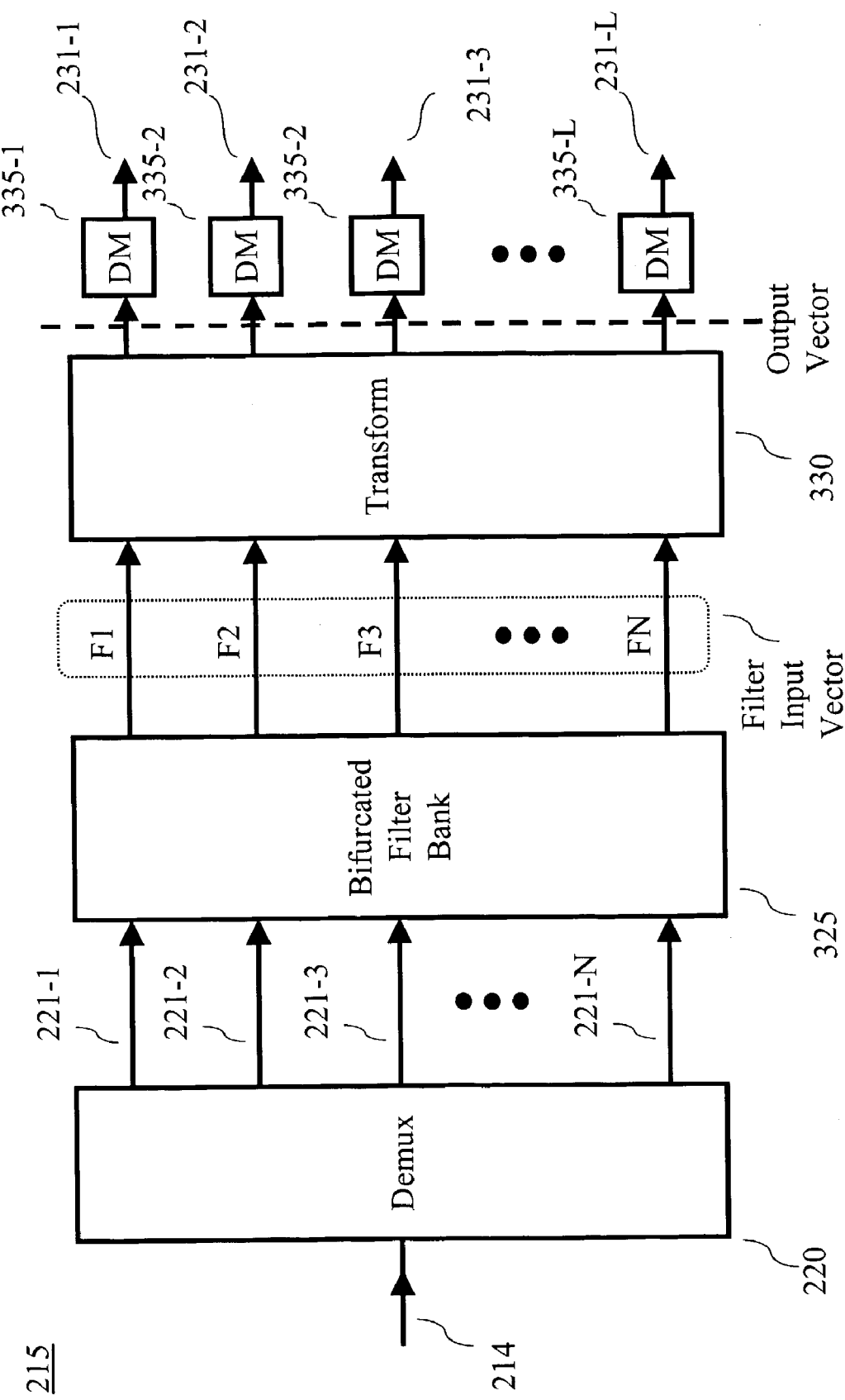
FIG. 6 is an illustrative embodiment of a multi-channel tuner in accordance with the principles of the invention.

An illustrative embodiment of a multi-channel tuner 215 in accordance with the principles of the invention is shown in FIG. 6. Multi-channel tuner 215 includes demultiplexer (demux) 220, bifurcated filter bank 325, transform element 330 and demodulators 335-1 to 335-L. Demux 220 samples signal 214 at a demultiplexer sampling rate, $F_F$, (or post-decimation sampling rate) to provide a number of decimated sample streams, 221-1 to 221-N, where N is the number of transponder channels, to bifurcated filter bank 325 (described further below). As such, $F_F=2F_S$. The bifurcated filter bank 325 forms a filter input vector to transform element 330 (described below), which recovers therefrom, via demodulators 335, a number of simultaneous bit streams from two or more transponder channels as represented by bit streams 231-1 through 231-L, where 1<L≦N.

In this illustrative embodiment, transform element 330 uses a type 4 Discrete Cosine Transform (DCT) for processing the filter input vector. The output vector from transform element 330 is further processed by a respective demodulator, 335-i, at each of the transponder carrier frequencies.

Figure 7:
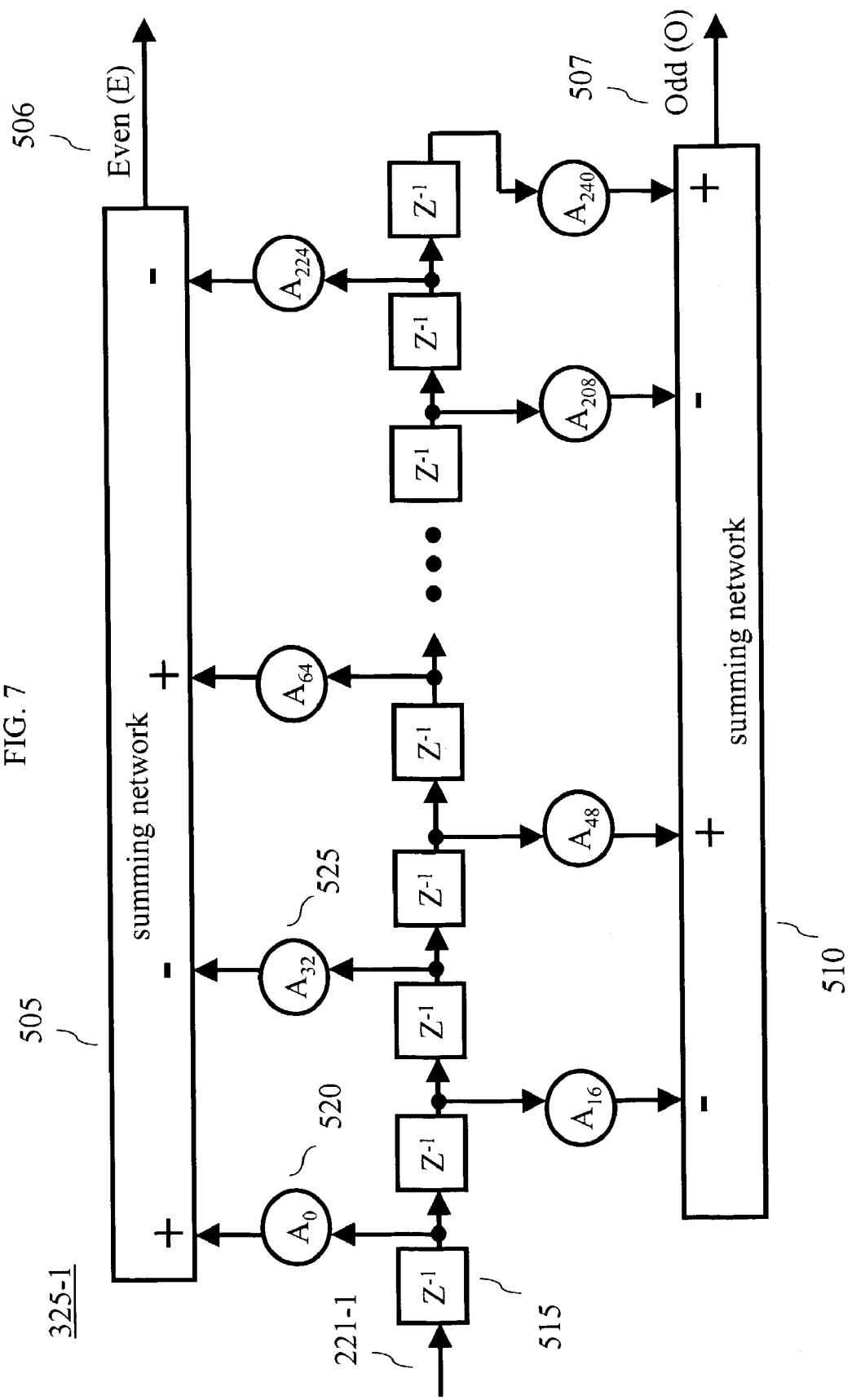
FIG. 7 shows an illustrative embodiment of a bifurcated filter in accordance with the principles of the invention.

Bifurcated filter bank 325 includes a number of bifurcated filters, 325-i, where 1≦i≦N, i.e., one bifurcated filter for a respective one of the N decimated streams from demux 220. Since all the bifurcated filters have a similar structure, only one bifurcated filter is described in detail herein. An illustrative bifurcated filter 325-1 in accordance with the principles of the invention is shown in FIG. 7. Bifurcated filter 325-1 receives decimated stream 221-1 from demux 220 and provides two output signals: signal 506, also designated as the even output signal (E), and signal 507, also designated as the odd output signal (O). Bifurcated filter 325-1 includes a number of delay elements as represented by delay element 515, a number of coefficient multipliers as represented by coefficient multiplier 520 (also referred to as tap coefficient 520) having a coefficient value of $A_0$, and two summing networks 505 and 510. The time delay elements, e.g., time delay element 515, delay the signal by an amount of time equal to the inverse of the demux sampling rate, i.e., $1/F_F$.

As can be observed from FIG. 7, summing network 505 adds together those values from the even coefficient multipliers to form the even output signal. Similarly, summing network 510 adds together those values from the odd coefficient multipliers to form the odd output signal. It can be further observed that each summing network 505 and 510 alternates the sign of the value from alternate coefficient multipliers. For example, the value from the coefficient multiplier 525 is inverted by summing network 505. In other words, the coefficients for the even output signal are the even numbered decimations by 2N alternated in sign, while the coefficients for the odd output signal are the odd numbered decimations by 2N. This alternating in sign implements the required inversions in sign required at points in time as illustrated by the axis of the graph in FIG. 4 for matching a type 4 DCT. This bifurcating filter structure shown in FIG. 7 results in the even tap partial sum being modulated by a direct type 4 DCT, while the odd tap partial sum is always modulated by a time reversed type 4 DCT. This can be realized with a single N point type 4 DCT by summing the vector of even taps partial sum to the vector of odd taps partial sum in reverse time order. In addition, it should be observed that in this example there are k=N tap coefficients per bifurcated filter, i.e., k=16 with respect to equation (4). As such, the total number of tap coefficients in this example is 256, which are spread among the 16 bifurcated filters as indicated in FIG. 7. In particular, bifurcated filter 325-1 illustratively includes the 16 tap coefficients: $A_0, A_{16}, A_{32}, A_{48}, A_{64}, \ldots, A_{208}, A_{224},$ and $A_{240}$, arranged as shown. Similarly, bifurcated filter 325-2 (not shown) includes the 16 tap coefficients: $A_1, A_{17}, A_{33}, A_{49}, A_{65}, \ldots, A_{209}, A_{225},$ and $A_{241}$. This pattern continues, such that the last bifurcated filter 325-N (not shown) includes the 16 tap coefficients: $A_{15}, A_{31}, A_{47}, A_{63}, A_{79}, \ldots, A_{223}, A_{239},$ and $A_{255}$. (Referring briefly back to FIG. 3, it could be observed that the taps of filter 145 are divided among the N bifurcated filters.)

It should also be noted that the effective N, or, e.g., 16, bifurcated filter responses have the same delay such that transform element 330 processes N decimated samples at the same time. In other words, at a particular time, $t_P$, a filter input vector is formed for application to transform element 330. This filter input vector includes one sample from each of the decimated sample streams at a particular sampling time. Turning back briefly to FIG. 6, the filter input vector comprises samples F1 through FN.

Figure 8:
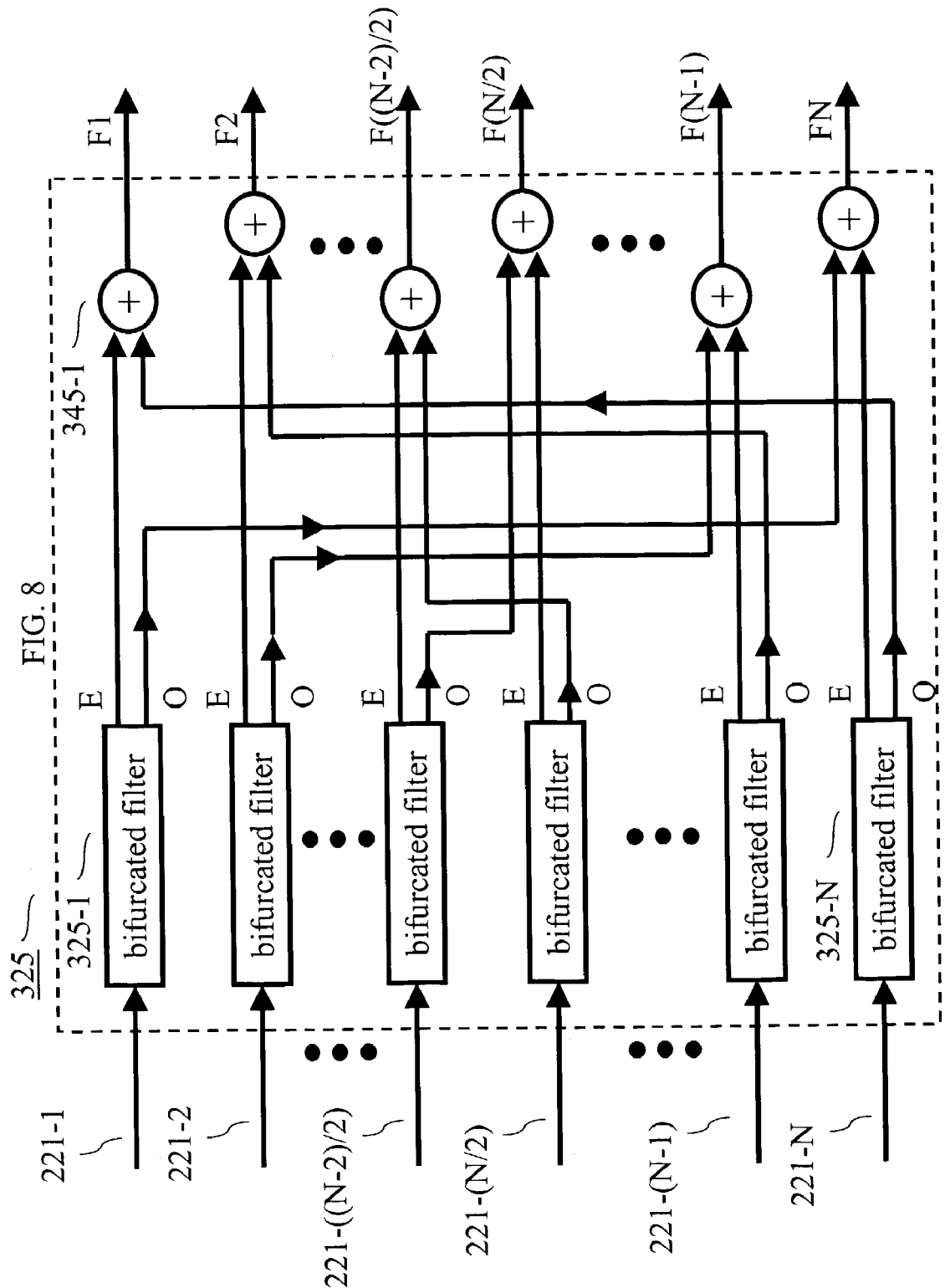
FIG. 8 shows an illustrative bifurcated filter bank in accordance with the principles of the invention.

An illustrative bifurcated filter bank is shown in FIG. 8. The latter illustrates the combination of the even signals and odd signals from each of the N bifurcated filters via N adders 345-i, $1 \leq I \leq N$, to complete the match to the symmetry of a DCT. For example, the even signal from bifurcated filter 325-1 is combined with the odd signal from bifurcated filter 325-N via adder 345-1. This provides the above-noted required time reversal illustrated in FIG. 4. As a result, bifurcated filter bank 325 provides the filter input vector [F1, F2, ..., FN] to transform element 330 as illustrated in FIG. 6.

Having matched the symmetry of a type 4 DCT with the use of the above-described bifurcated filter bank 325, transform element 330 provides a $DCT_{IV}$ transformation of the filter input vector, where:

$$O_C = DCT_{IV} F, \quad (5)$$

where F is the filter input vector, $O_C$ is an output vector, the elements of which represents each of the N transponder channels, and $DCT_{IV}$ is an implantation of an N-point type DCT. One illustrative implementation of transform element 330 is simply the implementation of equation (3), shown above. Indeed, in accordance with an aspect of the invention, any of the known algorithms to realize a type 4 DCT may be used, each having different computational efficiencies. However, for the high sampling rate applications targeted, a sparse factoring of the DCT IV matrix by exploiting relationships to the Discrete Fourier Transform (DFT) is preferred. One illustrative sparse factoring of an N=16 point DFT IV is provided below. In particular, $DCT_{IV}$ is:

$$DCT_{IV} = CF \cdot CE \cdot CDFT0 \cdot CDFT1 \cdot CDFT2 \cdot CDFT3 \cdot CDFT4 \cdot CDFT5 \cdot CD \cdot CC. \quad (6)$$

This factorization requires 62 additions and 46 multiplications. If all 16 transponder channels are simultaneously received this corresponds to 3.875 adds and 2.875 multiplies per channel per near base band sample (the demultiplexer sample rate is $2F_S$ in Hz)). The matrices shown in equation (6) are illustrated in FIGS. 9–16. It should be noted that the notation C(x) or S(x) illustrated in these figures represents the operations cosine(x) and sine(x), respectively. Further, where clearly identifiable portions of a matrix are equal to zero, a single "0" is entered on that portion of the matrix, as illustrated in matrix CD of FIG. 10.

Figure 17:
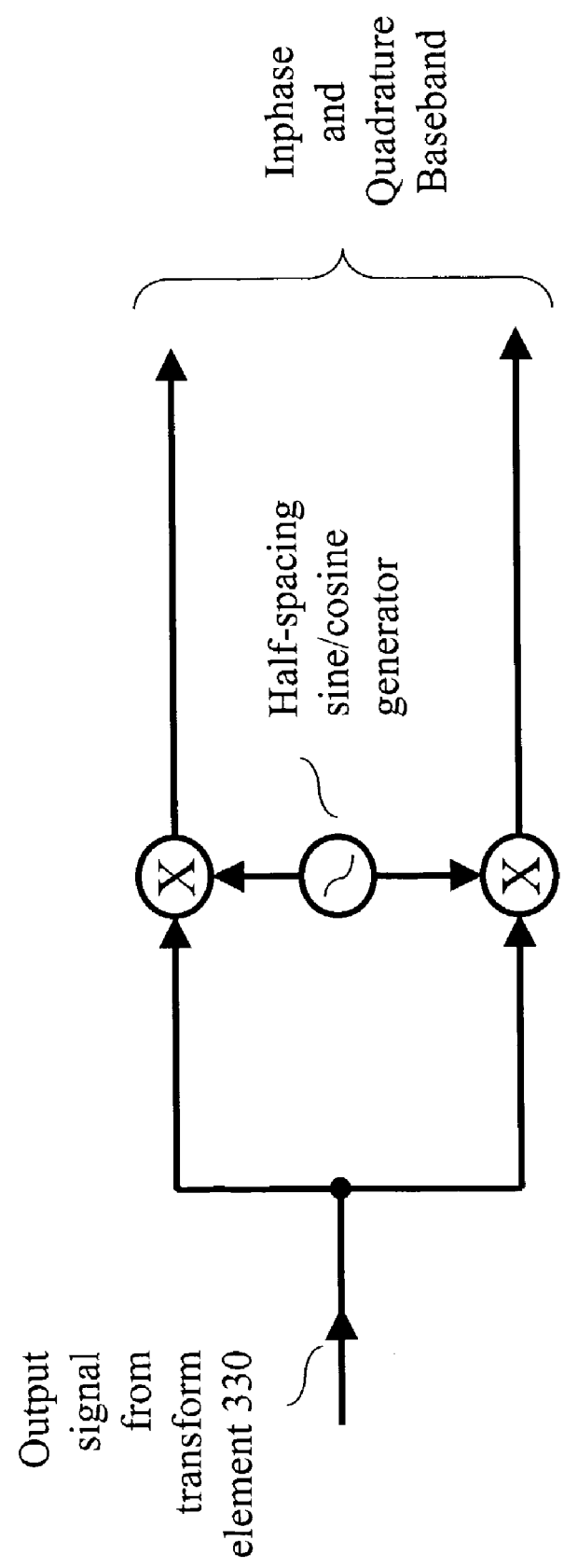
FIG. 17 is an illustrative block diagram of a demodulator for use in the embodiment of FIG. 6.

As noted above, an advantage of the use of a type 4 DCT is that the elements of the output vector represent each of the transponder channels wherein the IQ modulation is maintained as a real near base band signal for down stream conventional near base band demodulation. As such, each element of the output vector from transform element 330 is further processed by a respective demodulator, 335-i, at each of the transponder carrier frequencies. An illustrative demodulator is shown in FIG. 17 for processing an output signal from transform element 330 into a baseband IQ signal for a respective transponder channel. In this illustrative embodiment, one demodulator of the form illustrated in FIG. 17 is required for each desired transponder channel.

As described above, receiver 200 enables a plurality of frequency channels to be simultaneously tuned such that broadcast channel programs included within different frequency channels may be simultaneously accessed. In addition, and in accordance with an aspect of the invention, the amount of hardware and processing required to implement a multi-channel tuner is simplified by use of a single computation element as represented by transform element 330. For example, now all calculations are performed at a convenient rate, e.g., $F_F$.

Figure 18:
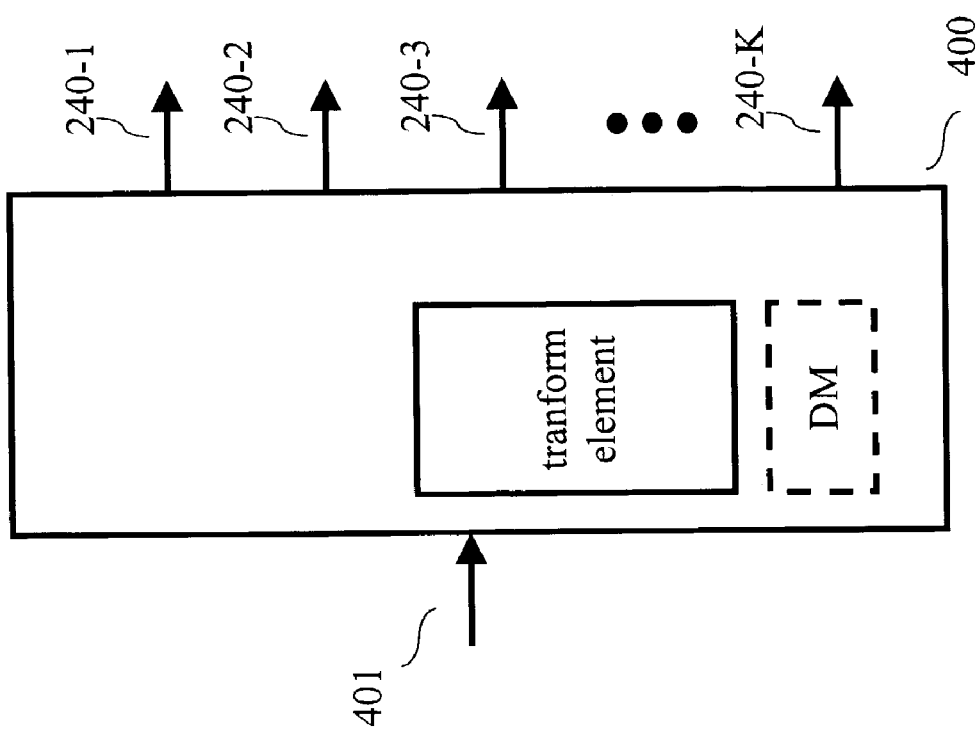
FIG. 18 is another illustrative embodiment in accordance with the principles of the invention.

As noted above, the transform element may be implemented in an integrated circuit such as an FPGA. As such, as shown in FIG. 18, a single-chip solution is possible for simultaneously providing content from different transponder channels. Illustratively, an integrated circuit 400 may include at least a transform element, such as represented by transform element 330, described above, to provide therefrom a plurality of virtual channels 240-1 to 240-K, where at least some of the content of these virtual channels are simultaneously provided from different transponder channels. As required, the integrated circuit 400 may include demodulators (DM), as described above.

It should be noted that other forms of LNB processing may also be used. For example, LNB 205 may perform a filtering operation to a relaxed specification with a broad transition band of width $(PF_S)$ above and below the N channel band to reach acceptable stop band attenuation, where P is an integer. Moreover, the LNB may spectrally move the lowest frequency channel so that the corresponding carrier $F_0$ is equal to $[F_S/2+(PF_S)]$. With this variation, the A/D converter 210 is clocked at the sampling rate $[2(N+(2P))F_S]$, and the number of demultiplexer parallel paths used for signal tuning is N+(2P). This variation may allow LNB 205 to utilize smaller, lower performance filters, rather than physically larger and lossy SAW filters.

Similarly, LNB 205 may provide signal 206 such that the frequency of the highest frequency channel (i.e., $F_N$) is arranged to fall on an even folding frequency of the demultiplexer sampling rate, $F_F$. This technique may be used for those highest frequency channels that satisfy:

$$F_F = 2\left[\frac{F_N + \frac{F_S}{2}}{2NF_S}\right], \quad (7)$$

when sampling A/D 210 at $2NF_S$, or $$F_F = \left[\frac{F_N + F_S(P + .5)}{2(N + 2P)F_S}\right], \quad (8)$$

when sampling A/D 210 at $[2(N+(2P))F_S]$.

Likewise, LNB 205 may provide signal 206 such that the frequency of the lowest frequency channel (i.e., $F_1$) is arranged to fall on an even folding frequency of the demultiplexer sampling rate, $F_F$. This technique may be used for those lowest frequency channels that satisfy:

$$F_F = 2\left[\frac{\frac{F_1 - F_2}{2}}{2NF_S}\right], \quad (9)$$

when sampling A/D 210 at $2NF_S$, or $$F_F = \left[\frac{F_1 - F_S(P + .5)}{2(N + 2P)F_S}\right], \quad (10)$$

when sampling A/D 210 at $[2(N+(2P))F_S]$.

It should also be noted that constraints on the clock rate of A/D 210 can be relaxed somewhat by inclusion of a sample rate converter. The latter representing a calculated sequence derived from some sampling (uniform or non-uniform) not conforming to the desired sample spacing T. In addition, it should be noted that other types of DCTs may be also be used in accordance with the inventive concept, e.g., type 2, type 3, etc. However, mismatches of boundary conditions in time and frequency entail a hardware and circuit complexity penalty for using these types of DCTs and, as such, are not described further herein.

Further, it should be noted that although described in the context of a satellite distribution, the inventive concept is not so limited and also applies to other distribution mechanisms whether wireless and/or wired. For example, the invention is applicable to cable, terrestrial or other networks (such as broadcast and/or commercial networks).

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as a separate elements, any or all of the elements of FIGS. 10 and 12 (e.g., 215 and/or 240) may be implemented in a stored-program-controlled processor. It is therefore to be understood that numerous modifications may be made to the illustrative embodiments and that other arrangements may be devised without departing from the spirit and scope of the present invention as defined by the appended claims.

The invention claimed is:

1. A receiver comprising:
    a receiver section for providing a signal having a plurality of different frequency channels, each frequency channel conveying a different bit stream; and
    a multi-channel signal tuner operative on the signal for recovering the different bit streams from at least two of the plurality of different frequency channels and for simultaneously providing the recovered different bits streams, wherein the multi-channel signal tuner utilizes a discrete cosine transformation (DCT)
    wherein the multi-channel signal tuner comprises:
    a sampler for sampling the signal to provide a number of decimated sample streams;
    a transform element operative on the number of decimated sample streams to provide transform output signals wherein the transform element utilizes the DCT; and
    a number of demodulators operative on the transform output signals to provide the recovered different bit streams.

2. The receiver of claim 1, wherein the sampler includes:
    a demultiplexer for demultiplexing the signal into the number of decimated sample streams; and
    a divided filter bank for processing the number of decimated sample streams for matching the DCT utilized by the transform element.

3. The receiver of claim 2, wherein the divided filter bank includes a bank of bifurcated filters and the DCT is an N-point type IV DCT.

4. The receiver of claim 3, wherein the transform element performs matrix-based processing on the number of decimated sample steams using a sparse matrix factorization of the N-point type IV DCT.

5. The receiver of claim 1, further comprising a broadcast channel distributor for providing a number of virtual channels from the recovered different bit streams.

6. A satellite receiver comprising:
    a low-noise block for receiving a signal representing a plurality of different transponder channels and an analog-to-digital converter for providing therefrom a data signal representing a sequence of samples occurring at a sample rate greater than, or equal to, a Nyquist rate related to a total bandwidth of the plurality of different transponder channels, each transponder channel conveying a bit stream;
    a sampler for sampling the data signal for providing N decimated data streams, where N>1;
    a transform element operative on the N decimated data streams for simultaneously providing at least two transform output signals from at least two of the plurality of different transponder channels, wherein the transform element utilizes a discrete cosine transformation (DCT); and at least two demodulators operative on the at least two transform output signals to provide at least two bit streams from the plurality of different transponder channels.

7. The satellite receiver of claim 6, wherein the sampler includes:
a demultiplexer for demultiplexing the signal into the number of decimated data streams; and
a divided filter bank for processing the number of decimated sample streams for matching the DCT utilized by the transform element.

8. The satellite receiver of claim 6, wherein the divided filter bank includes a bank of bifurcated filters and the DCT is an N-point type IV OCT.

9. The satellite receiver of claim 8, wherein the transform element performs matrix-based processing on the number of decimated data steams using sparse matrix factorization.

10. The satellite receiver of claim 6, further comprising a broadcast channel distributor for providing a number of virtual channels from the at least two bit streams.

11. A multi-channel tuner comprising:
a sampler for sampling a signal representing a plurality of different frequency channels to provide a plurality of sample streams, each frequency channel conveying a transport bit stream;
a bank of filters for filtering the plurality of sample streams to provide a plurality of filtered sample streams;
a discrete cosine based transform element operative on the plurality of filtered sample streams to provide a plurality of data signals, each data signal associated with one of the different frequency channels; and
a plurality of demodulators for demodulating each of the plurality of data signals to simultaneously provide the transport bit streams.

12. The multi-channel tuner of claim 11 wherein the plurality of data signals is at least two.

13. The multi-channel tuner of claim 11, wherein the bank of filters include a plurality of bifurcated filters and the discrete cosine based transform element uses a type IV discrete cosine transform.

14. A method for use in a receiver comprising:
providing a signal having a plurality of different frequency channels, each frequency channel conveying a different bit stream; and
performing multi-channel signal tuning on the signal for recovering the different bit streams from at least two of the plurality of different frequency channels; and
simultaneously providing the recovered different bits streams,
wherein the step of multi-channel signal tuning utilizes a discrete cosine transformation (DCT) and
wherein the multi-channel signal tuning step comprises;
sampling the signal to provide a number of decimated sample streams;
performing transform-based processing on the number of decimated sample streams to provide transform output signals wherein the transform based processing utilizes the DCT; and
demodulating the transform output signals to provide the recovered different bit streams.

15. The method claim 14, wherein the sampling step includes:
demultiplexing the signal into the number of decimated sample streams; and
processing the number of decimated sample streams with a divided filter bank for matching the DCT utilized by the transform element.

16. The method of claim 15, wherein the divided filter bank includes a bank of bifurcated filters and the DCT is an N-point type IV DCT.

17. The method of claim 14, wherein the performing transform-based processing step performs matrix-based processing on the number of decimated sample steams using a sparse matrix factorization of the N-point type IV DCT.

18. The method of claim 14, further comprising the step of providing a number of virtual channels from the recovered different bit streams.

* * * * *